United States Patent [19]
Onizuka et al.

[11] Patent Number: 5,771,575
[45] Date of Patent: Jun. 30, 1998

[54] AUTOMOBILE INSTRUMENT PANEL HARNESS-CONNECTING CONSTRUCTION

[75] Inventors: Takahiro Onizuka; Yasuhiro Hattori, both of Nagoya, Japan

[73] Assignees: Harness System Technologies Research, Ltd., Nagoya; Sumitomo Wiring Systems, Ltd., Yokkaichi; Sumitomo Electric Industries, Ltd., Osaka, all of Japan

[21] Appl. No.: 753,339

[22] Filed: Nov. 22, 1996

[51] Int. Cl.[6] ................................................. H01R 43/00
[52] U.S. Cl. ........................... 29/868; 29/755; 174/72 A; 439/34
[58] Field of Search ..................... 29/868, 755; 439/34; 174/72 A

[56] References Cited

U.S. PATENT DOCUMENTS

| | | |
|---|---|---|
| 4,355,853 | 10/1982 | Kourimsky . |
| 4,906,195 | 3/1990 | Kubota et al. . |
| 4,910,641 | 3/1990 | Yanase . |
| 4,929,182 | 5/1990 | Hyogo et al. . |
| 5,324,203 | 6/1994 | Sano et al. . |
| 5,353,190 | 10/1994 | Nakayama et al. . |
| 5,663,866 | 9/1997 | Ichikawa et al. . |

FOREIGN PATENT DOCUMENTS 1-142345  9/1989  Japan .

*Primary Examiner*—Carl J. Arbes
*Attorney, Agent, or Firm*—Oliff & Berridge, PLC

[57] ABSTRACT

An instrument panel harness is arranged between an instrument panel and a body, and can be easily connected to other wire harnesses, thereby reducing the time and labor required for the operation. A junction box, connected to an instrument panel harness is divided into a first junction box, having a large-current circuit, and a second junction box having a small-current circuit, and a pair of collective-fitting connector portions, fitted together, are provided on the first and second junction boxes, respectively. The first junction box is attached to an instrument panel, and is connected to the instrument panel harness. The second junction box is attached to a body panel and a plurality of harness connector portions, fitted respectively on wire harnesses, are provided on the second junction box.

10 Claims, 3 Drawing Sheets

AUTOMOBILE INSTRUMENT PANEL HARNESS-CONNECTING CONSTRUCTION

BACKGROUND OF THE INVENTION

1. Field of the Invention

This invention relates to a construction for connecting an instrument panel harness in an automobile, and more particularly to the type of construction in which a junction box, connected to the instrument panel harness, is formed into a small-size design. Also, the efficiency of connecting the instrument panel harness to other wire harnesses is improved by the use of this junction box.

2. Description of the Related Art

In a conventional construction, two kinds of wire harnesses, an instrument panel harness and a cowl harness, are arranged between an instrument panel and a cowl panel of a body in an automobile. Both the instrument panel harness and the cowl harness include a power wire, a signal wire and an earth wire in a mixed manner. A junction box 1 (shown in FIG. 3) to be connected to these wire harnesses is assembled in such a manner that the junction box 1 is connected to either the instrument panel harness W/H1 or the cowl harness W/H2 through a connector.

In an automobile assembly line, the cowl harness W/H2 is arranged along a cowl panel 2 of the body, and is fixed by clamps while the instrument panel harness W/H1 is arranged along an instrument panel 3, and is fixed by clamps. In this condition, the instrument panel 3 is attached to the cowl panel 2. Then, connectors 4 of a front harness W/H3, a floor harness W/H4, a roof harness W/H5 and a door harness W/H6 are fitted respectively in connector fitting portions 1a of the junction box 1. A connector 5 of either the instrument panel harness or the cowl harness (whichever one is not connected to the junction box 1 above) is fitted in the connector fitting portion 1a of the junction box 1. After all the necessary connectors are fitted in the junction box 1, the junction box 1 is fixed to a body panel at the cowl side.

As described above, both the instrument panel harness and the cowl harness, arranged respectively on the instrument panel and the body panel, include a power wire, a signal wire and an earth wire in a mixed manner. These wire harnesses have a large size, and the junction box 1, to which these wire harnesses are connected, also has a large size, and therefore a lack of installation space becomes a problem. Also, the mounting of the junction box on the body panel can not be effected easily.

When connecting many connectors to the junction box, the operator's hands must be extended into a blind space between the cowl panel 2 on the body and the instrument panel 3 from the lower side so as to effect this connecting operation. Also, the operator must crouch and stoop during the connecting operation, which imposes a large physical burden on the operator. Further, the floor harness, the front harness, the roof harness, the door harness and either the instrument panel harness or the cowl harness must be connected to the junction box. Since many connectors must be fitted in the junction box, much time is required for the connector-connecting operation.

To deal with the above problems, and more specifically to easily connect wire harnesses (which are to be connected respectively to an instrument panel and a body) together, there has recently been proposed a construction (Japanese Utility Model Unexamined Publication No. 1-142345) in which a connector of the instrument panel-side wire harness and a connector of the body-side wire harness are fixed respectively to the instrument panel and the body in opposed relation to each other, and simultaneously when attaching the instrument panel to the body, the connectors are connected together.

However, it is not easy to fit the multi-pole connectors, fixed respectively to the instrument panel and the body, together simultaneously when attaching the large-size instrument panel to the body. For example, even though the precision of the fixed position of each connector is enhanced, the fitting of the connectors can not be effected if the direction of mounting of the instrument panel is even slightly deviated.

Further, after many connectors are connected, the junction box must be fixed to the body, and this fixing operation must be carried out in a blind manner, and therefore is not easy. Thus, a problem has been encountered in that the fitting of the connectors in the conventional junction box, as well as the fixing of the junction box to the body, can not be effected efficiently.

SUMMARY OF THE INVENTION

The present invention has been made in view of the above problems, and an object of the invention is to provide a construction in which an instrument panel harness, arranged between an instrument panel and a body, can be easily connected to other wire harnesses, thereby reducing the time and labor required for the operation.

The above object has been achieved by an automobile instrument panel harness-connecting construction wherein a junction box, connected to an instrument panel harness, is divided into a first junction box, having a large-current circuit, and a second junction box having a small-current circuit, and a pair of collective-fitting connector portions, fitted together, are provided on the first and second junction boxes, respectively;

wherein the first junction box is attached to an instrument panel, and is connected to the instrument panel harness; and wherein the second junction box is attached to a body panel, and a plurality of harness connector portions, fitted respectively on a front wire harness, a floor wire harness, a roof wire harness and a door wire harness, are provided on the second junction box.

The large-current circuit of the first junction box comprises a shared power circuit, an earth (or ground) circuit, and a large-current power circuit connected to these circuits in a branched manner. The small-current circuit of the second junction box comprises signal circuits, connected respectively to the front wire harness, the floor wire harness, the roof wire harness and the door wire harness, and a small-current power circuit. Relays and fuses are mounted on the first junction box. The large-size junction box, which has conventionally been fixed to the body panel at a later stage of the mounting operation, is divided into the first junction box and the second junction box which have the large-current circuit and the small-current circuit, respectively.

Therefore, the internal circuit of each of the two junction boxes can be of a simple, small construction. The first and second junction boxes are attached respectively to the instrument panel and the body panel before the instrument panel is attached to the body panel, and the two junction boxes are electrically connected together when the instrument panel is attached to the body panel. Therefore, the same function as achieved by the conventional large-size junction box is obtained.

The instrument panel harness is connected to the other wire harnesses in order to connect the other wire harnesses, through connectors, to the second junction box when the collective-fitting connector portions of the first and second junction boxes are fitted together. Thus, by connecting the pair of junction boxes together, the instrument panel harness can be connected to all the other wire harnesses at one time, and therefore a reduction in the time and labor required can be achieved as compared with the conventional connector fitting operation. Particularly, after the instrument panel is mounted on the body panel, the fitting of the connectors of the wire harnesses is not necessary, and also the fixing of the junction box to the body after the fitting of the connectors is not necessary.

The first junction box and the second junction box comprise the large-current circuit and the small-current circuit, respectively. Therefore, each of the instrument panel harness, connected to the first junction box, and the other wire harnesses, connected to the second junction box, does not include the power circuit, the signal circuit and the earth circuit in a mixed manner, resulting in a simple construction. In addition, when the instrument panel harness comprises a bundle of wires that does not include the wire of the power circuit, two large-size wire harnesses (that is, an instrument panel harness and a cowl harness), which have conventionally been separate from each other, can be combined into one wire harness, and therefore it is necessary to install only one large-size wire harness in a narrow space between the instrument panel and the body panel, so that the efficiency of the operation can be enhanced.

Preferably, the first junction box and/or the second junction box are movably mounted on the instrument panel and body, respectively, through resilient support members.

More specifically, the first junction box to be attached to the instrument panel is movably supported within an outer frame, fixed to the instrument panel, through rubber members or springs whereas the second junction box is fixed to the body panel.

When one of the junction boxes is thus movable, any dimensional error can be absorbed when fitting the two junction boxes together through the connectors, so that this fitting operation can be effected easily. Particularly when the connectors are of the multi-pole type, the two cannot be easily fitted together if the two are fixed. However, if one or both of the two are movable so as to absorb a dimensional error, the two can be fitted together smoothly.

As is clear from the above description, in the automobile instrument panel harness-connecting construction of the present invention, a large-size junction box, which has conventionally been fixed to a body panel at a later stage of the mounting operation, is divided into a first junction box and a second junction box, and therefore the internal circuit of each of the two junction boxes can be of a simple, small construction. The first junction box and the second junction box have the large-current circuit and the small-current circuit, respectively. Therefore each of the instrument panel harness, connected to the first junction box, and the other wire harnesses connected to the second junction box does not include the power circuit, the signal circuit and the earth circuit in a mixed manner, and each wire harness can be of a simple construction. In addition, when the instrument panel harness comprises a bundle of wires that does not include the wire of the power circuit, two large-size wire harnesses (that is, an instrument panel harness and an cowl harness), which have conventionally been separate from each other, are combined into one wire harness, and therefore it is necessary to install only one large-size wire harness in a narrow space between the instrument panel and the body panel, so that the efficiency of the operation can be enhanced.

The two junction boxes are fitted together simultaneously when fixing the instrument panel to the body panel, so that the instrument panel harness is connected to all of the other wire harnesses at one time. Thus, the connector fitting operation can be effected at one time, greatly reducing the time and labor required. Namely, the connection of many connectors to the junction box, which could not be effected easily in the conventional construction since this must be manually carried out in a narrow space, is not necessary, and also the fixing of the junction box to the body panel is not necessary, and therefore the efficiency of mounting the wire harnesses is greatly enhanced.

The first junction box and/or the second junction box are movable relative to their associated panel so as to absorb a dimensional error. With this construction, when the collective-fitting connector portions of the two junction boxes, when attached respectively to the instrument panel and the body panel, are out of registry with each other, this misregistration is absorbed, so that the two connector portions can be positively fitted and connected together. Particularly when the connectors are of the multi-pole type, the two can not be easily fitted together if the two junction boxes are fixed. However, if one or both of the two are movable so as to absorb a dimensional error, the two can be fitted together smoothly.

DETAILED DESCRIPTION OF PREFERRED EMBODIMENTS

A preferred embodiment of the present invention will now be described with reference to the drawings.

Figure 1:
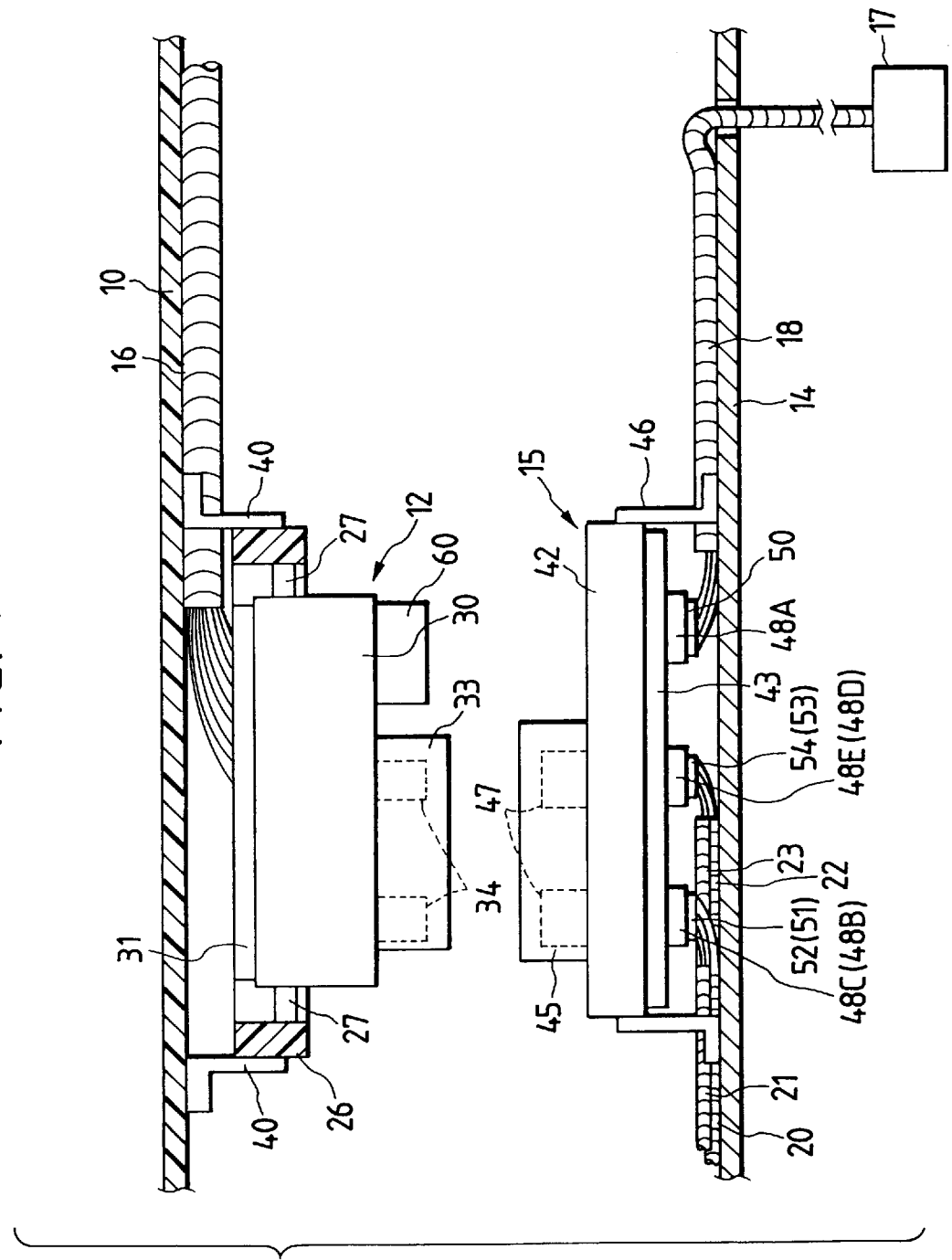
FIG. 1 is a plan view of a preferred embodiment of the present invention, showing a condition before a first junction box, attached to an instrument panel, is fitted in a second junction box attached to a body panel.
Figure 2:
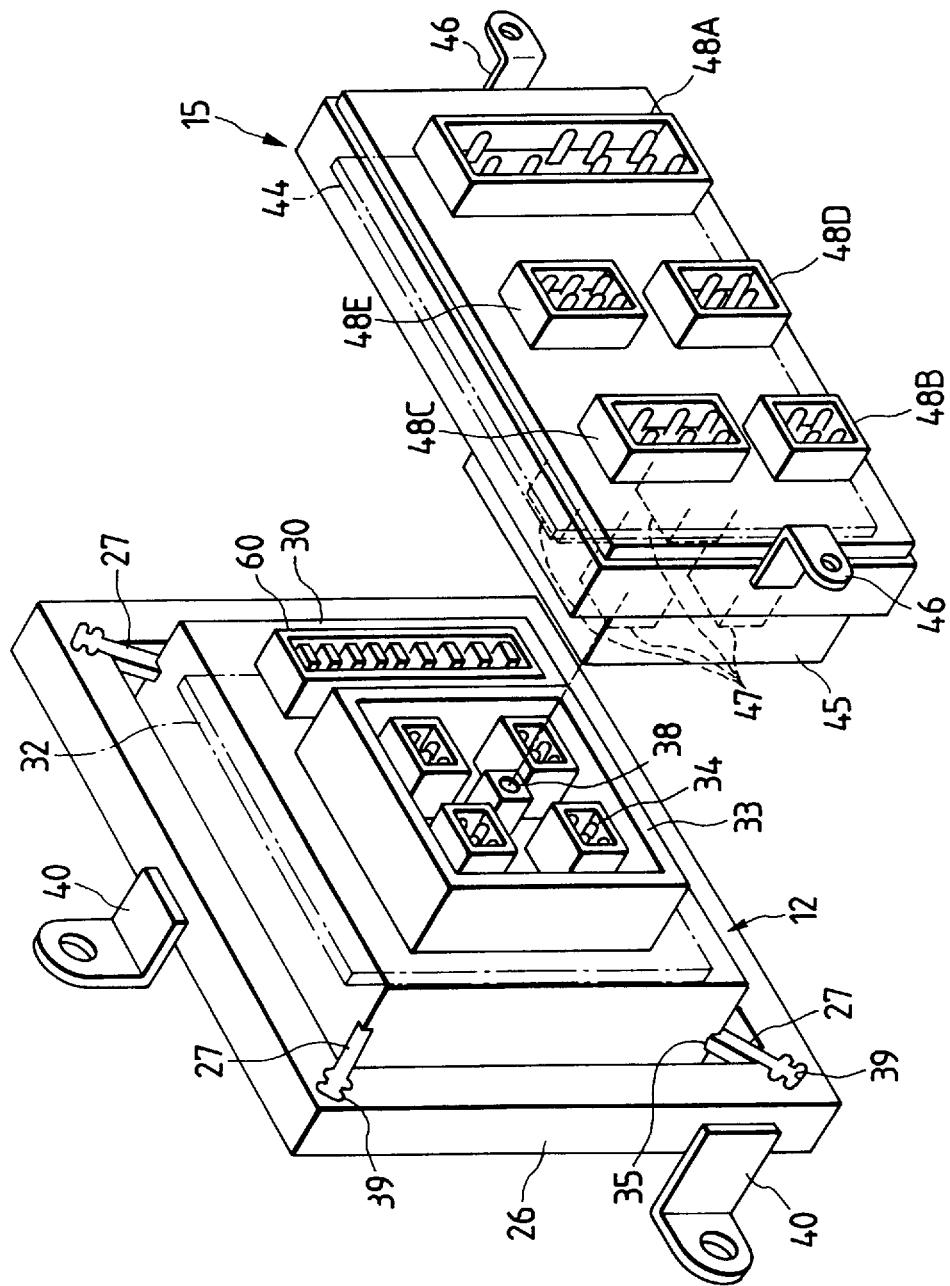
FIG. 2 is an exploded, perspective view showing the first junction box and the second junction box.
Figure 3:
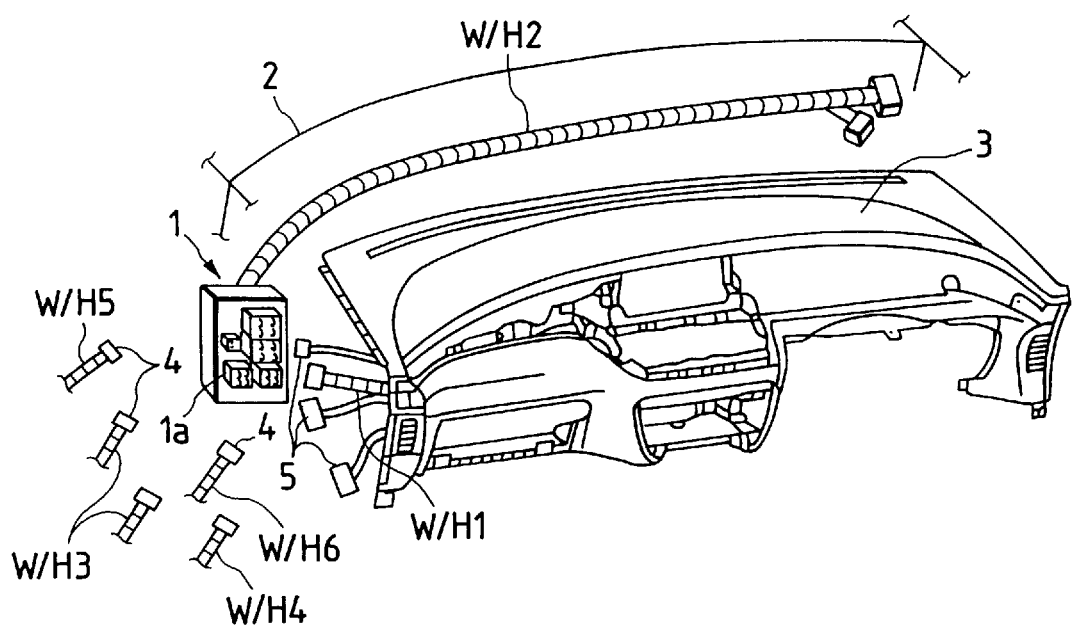
FIG. 3 is a perspective view showing a junction box electrically connecting an instrument panel harness and a cowl harness in a conventional construction.

As shown in FIGS. 1 and 2, there are provided a first junction box 12, having a large-current circuit 32, and a second junction box 15 having a small-current circuit 44, the first and second junction boxes 12 and 15 being adapted to be mounted on an instrument panel 10 and a body panel 14, respectively. Thus, the function of a conventional function box is divided into those of the first and second junction boxes 12 and 15.

More specifically, an internal circuit in the form of a bus bar 32 mounted within the first junction box 12 constitutes the large-current circuit while an internal circuit in the form of a bus bar 44 mounted within the second junction box 15 constitutes the small-current circuit. The internal circuits of the first and second junction boxes 12 and 15 are not limited to the bus bar, and may be a combination of single-conductor wires and press-connecting terminals, or the internal circuit (large-current circuit) of the first junction box 12 may be constituted by a bus bar while the internal circuit (small-current circuit) of the second junction box 15 may be constituted by single-conductor wires and press-connecting terminals.

An instrument panel harness 16 is beforehand connected to the first junction box 12 to be connected to the instrument panel 10, and in an automobile assembly line the first junction box 12 and the instrument panel harness 16 are attached to the instrument panel 10. Alternatively, the first junction box 12 and the instrument panel harness 16 may be separate from each other, and the two may be connected together in the assembly line simultaneously when attaching them to the instrument panel 10.

The second junction box 15 to be attached to the body panel 14 is attached to the body panel 14 in the automobile assembly line, and other wire harnesses, that is, a front harness 20, a floor harness 21, a roof harness 22 and a door harness 23, are connected to the second junction box 15.

As described above, the first junction box 12, having the associated wire harness connected thereto, is attached to the instrument panel 10, and also the second junction box 15, having the associated wire harnesses connected thereto, is attached to the body panel 14. When the instrument panel 10 is attached to the body panel 14, the first junction box 12 is simultaneously fitted in the second junction box 15, thereby electrically connecting the first and second junction boxes together.

The instrument panel harness 16 to be connected to the first junction box 12 having the large-current circuit includes a cowl harness without a power circuit 18 connected to a power source 17 such as a battery. Namely, two large-size wire harnesses (that is, an instrument panel harness and a cowl harness) which have been separate from each other in the conventional construction, are combined together into the instrument panel harness 16 (which is to be attached to the instrument panel 10) including all the wires except the wire 18 connected to the power source 17.

The wire harness to be connected to the second junction box 15 having the small-current circuit includes the power circuit 18 connecting the power source 17 to the second junction box 15. The front harness 20, the floor harness 21, the roof harness 22 and the door harness 23 are connected to the second junction box 15 through respective connectors.

The first junction box 12 comprises an upper case 30 and a lower case 31, and the bus bar 32, constituting the above large-current circuit, is mounted within a space formed by these cases 30 and 31. The bus bar 32 comprises a shared power circuit, an earth circuit, and a large-current power circuit connected to these circuits in a branched manner.

The first junction box 12 includes relays and fuses connected to the bus bar (large-current circuit) 32. In this embodiment, the first junction box 12 is mounted on an outer frame 26 (adapted to be fixed to the instrument panel 10) through resilient support members 27, so that the first junction box 12 is movable so as to absorb a dimensional error when fitting the first junction box 12 in the second junction box 15.

A collective-fitting connector portion 33 for fitting connection to the second junction box 15 is mounted on an upper surface of the upper case 30, and a fuse mounting portion 60 for mounting the above fuses thereon is also mounted on the upper surface of the upper case 30. Male terminals 34, connected to the bus bar 32, are projected into the interior of the connector portion 33. Mounting portions 35 are provided respectively at four corners of an outer peripheral surface of the upper casing 30, and the resilient support members 27 are mounted respectively at the mounting portions 35. The instrument panel harness 16 is connected to the bottom surface of the lower case 31.

The outer frame 26 of a square shape surrounds the case of the first junction box, and is spaced a predetermined distance from the outer peripheral surface of this case.

Mounting portions 39 are formed respectively at the inner sides of the four corners of the outer frame 26 respectively facing the mounting portions 35, and the resilient support members 27 are mounted respectively at the mounting portions 39. Brackets 40 are formed respectively on predetermined portions of the outer peripheral surface of the outer frame 26, and the outer frame 26 is attached to the instrument panel 10 by the brackets 40.

The resilient support member 27 comprises a rubber member or a spring, and one end thereof is retained on the mounting portion 35 of the first junction box 12 whereas the other end thereof is retained on the mounting portion 39 of the outer frame 26, and the first junction box 12 is held within the outer frame 26 in such a manner that the first junction box 12 is movable within the outer frame 26.

Like the first junction box 12, the second junction box 15 to be fixed to the body panel 14 comprises an upper case 42 and a lower case 43, and the bus bar 44, constituting the small-current circuit, is mounted within a space formed by these cases 42 and 43. The bus bar 44 comprises signal circuits, connected respectively to the front harness 20, the floor harness 21, the roof harness 22 and the door harness 23, and a small-current power circuit.

A collective-fitting connector portion 45 for fitting connection to the connector portion 33 of the first junction box 12 is formed on an upper surface of the upper case 42 of the second junction box 15. Female terminals 47, connected to the bus bar 44, are projected into the interior of the connector portion 45, and are respectively fitted on and electrically connected to the male terminals 34 in the connector portion 33. Brackets 46 are formed respectively on predetermined portions of the outer peripheral surface of the upper case 42, and the second junction box 15 is attached to the body panel 14 by the brackets 46.

A plurality of harness connector portions for fitting respectively on the plurality of wire harnesses are formed on the bottom surface of the lower case 43. In this embodiment, five harness connector portions 48A to 48E are provided, and a connector 50 of the power circuit 18 is fitted in the harness connector portion 48A, and connectors 51, 52, 53 and 54, secured respectively to ends of the front harness 20, the floor harness 21, the roof harness 22 and the door harness 23, are fitted respectively in the harness connector portions 48B to 48E.

Next, the process of connecting the instrument panel harness 16 to the wire harnesses, arranged on the body panel 14, using the first and second junction boxes 12 and 15 will be described.

First, before the instrument panel 10 is attached to the body panel 14, the instrument panel harness 16 is arranged in position on the instrument panel 10, and the brackets 40, formed on the outer frame 26 of the first junction box 12, are secured to the instrument panel 10, thereby fixing the first junction box 12.

On the other hand, the second junction box 15 is attached to the body panel 14, and the connectors 50 to 54 of the power circuit 18 and the wire harnesses 20 to 23 are fitted in and connected to the harness connector portions 48A to 48E of the second junction box 15, respectively. The power circuit 18 and the wire harnesses 20 to 23 are arranged in position on the body panel 14.

The fitting of the connectors 50 to 54, the attachment of the first function box 12 to the instrument panel 10, and the attachment of the second junction box 15 to the body panel 14 can be effected in a wide space available before the instrument panel 10 is attached to the body panel 14, and therefore these operations can be carried out efficiently.

Then, the instrument panel 10 is attached to the body panel 14. At this time, the collective-fitting connector portions 33 and 45 of the first and second junction boxes 12 and 15 are first brought into contact with each other. At this time, even if the two connector portions 33 and 45 are out of registry with each other, the resilient support members expand and contract to allow the first junction box 12 to move, thereby eliminating this misregistration. Thus, the first junction box is movable, and therefore the fitting position is finely adjusted, thereby absorbing an error, so that the collective-fitting connector portions 33 and 45 can be easily fitted together.

In this condition, when the instrument panel 10 is pressed toward the body panel 14, the connector portions 33 and 45 are fitted together to be electrically connected together, and the instrument panel 10 is attached to the body panel 14. In this condition, the instrument panel 10 is fixedly secured to the body panel 14 by bolts or the like.

Thus, by fitting and connecting the pair of junction boxes 12 and 15 together, the instrument panel harness 16 can be connected to the wire harnesses 18 and 20 to 23 at one time, and the time and labor required are much reduced as compared with the conventional connector fitting operation. Namely, after the instrument panel 10 is mounted on the body panel 14, the fitting of the connectors of the wire harnesses is not necessary, and also the fixing of the junction box to the body after the fitting of the connectors is not necessary, and therefore the efficiency of the mounting operation can be greatly enhanced.

Since the first and second junction boxes have the large-current circuit and the small-current circuit, respectively, each of the instrument panel harness 16, connected to the junction box 12, and the body panel-side wire harnesses, connected to the junction box 15, does not include the power circuit, the signal circuit and the earth circuit in a mixed manner. Therefore the wire harnesses can be of a simple construction. In addition, when the instrument panel harness 16 comprises a bundle of wires that does not include the wire of the power circuit 18, it is necessary to install only one large-size wire harness in a narrow space between the instrument panel 10 and the body panel 14, so that the efficiency of the operation can be enhanced.

Where the collective-fitting connector portions 33 and 45 are a multi-pole connector, the two connector portions 33 and 45 can not be easily fitted together if the two junction boxes 12 and 15 are fixed. In this embodiment, however, the first junction box 12 is movable relative to the instrument panel 10 to such a degree as to absorb a dimensional error, and therefore this fitting operation can be effected smoothly.

The construction of connecting the instrument panel of an automobile according to the present invention is not limited to the above construction, and the junction box does not always need to be mounted on the panel so as to move relative thereto, and may be fixed thereto. Alternatively, both of the first and second junction boxes may be movable.

Where the collective-fitting connector portions 33 and 45 are of the multi-pole type, and the two connector portions 33 and 45 can not be easily fitted together merely by pressing the instrument panel 10 and body panel 14, there may be used an arrangement in which through holes, which can face each other, formed respectively through the first and second junction boxes 12 and 15, bolts are passed, and nuts are threaded on these bolts, thereby fitting the two connector portions 33 and 45 together. In this case, preferably, these bolts serve also as fasteners for fastening the instrument panel 10 and the body panel 14 together.

What is claimed is:

1. An automobile instrument panel harness-connecting construction for an automobile having an instrument panel attached to a body panel, comprising:

a junction box divided into a first junction box, having a large-current circuit, and a second junction box having a small-current circuit; and a collective-fitting connector portion provided on each of said first and second junction boxes, the collective-fitting connector portion on the first junction box fitting together with the collective-fitting connector portion on the second junction box;

wherein said first junction box is attached to the instrument panel, and is connected to an instrument panel harness; and wherein said second junction box is attached to the body panel, and a plurality of harness connector portions are provided on said second junction box for attaching a corresponding plurality of wire harnesses, other than said instrument panel wire harness, to the second junction box.

2. An automobile instrument panel harness-connecting construction according to claim 1, in which said large-current circuit of said first junction box comprises a shared power circuit, an earth circuit, and a large-current power circuit connected to these circuits in a branched manner;

wherein said small-current circuit of said second junction box comprises a plurality of signal circuits, connected respectively to said corresponding plurality of wire harnesses, and a small-current power circuit; and wherein relays and fuses are mounted on said first junction box.

3. An automobile instrument panel harness-connecting construction according to claim 1, in which at least one of said first junction box and said second junction box is movably mounted on said instrument panel and the body panel, respectively, through resilient support members.

4. The automobile instrument panel harness-connecting construction of claim 1, wherein the corresponding plurality of wire harness includes a front body wire harness, a floor wire harness, a roof wire harness and a door wire harness.

5. A method for assembling an automobile instrument panel harnessing-connecting construction, comprising the steps of connecting a first junction box to an instrument panel of the automobile, the first junction box being connected to an instrument panel wire harness and having a large-connect circuit;

connecting a second junction box to a body panel of the automobile, the second junction box including a small current circuit and a plurality of harness connector portions;

connecting a corresponding plurality of wire harnesses, other than said instrument panel wire harness to the plurality of harness connector portions on the second junction box;

thereafter electrically connecting the first and second junction boxes when the instrument panel is attached to the body panel.

6. The method of claim 5, further comprising the steps of separating a power circuit from both the instrument panel wire harness and the corresponding plurality of wire harnesses and attaching the power circuit to a power connector portion on the second junction box separately from the plurality of harness connector portions.

7. The method of claim 5, further comprising the step of resiliently mounting the first junction box on the instrument panel.

8. The method of claim 5, further comprising the step of resiliently mounting the second junction box on the instrument panel.

9. The method of claim 7, further comprising the step of resiliently mounting the second junction box on the instrument panel.

10. The method of claim 5, wherein the step of electrically connecting the first and second junction boxes includes the step of providing a collective fitting portion on each of the first and second junction boxes; and fitting together the collective fitting portions by attaching the first junction box to the second junction box.

* * * * *

UNITED STATES PATENT AND TRADEMARK OFFICE
CERTIFICATE OF CORRECTION

PATENT NO. : 5,771,575
DATED : June 30, 1998
INVENTOR(S) : Takahiro ONIZUKA and Yasuhiro HATTORI It is certified that error appears in the above-indentified patent and that said Letters Patent is hereby corrected as shown below:

On the title page, please add:

- Item [56] - Foreign Application Priority Data

Nov. 28, 1995   [JP]   Japan................7-308911--

Signed and Sealed this

Sixth Day of July, 1999

*Attest:*

Q. TODD DICKINSON

*Attesting Officer*     Acting Commissioner of Patents and Trademarks